(12) United States Patent
Deivasigamani et al.

(10) Patent No.: US 9,971,325 B2
(45) Date of Patent: May 15, 2018

(54) USER TRAVEL DIRECTION BASED APPLIANCE CONTROL METHOD

(71) Applicants: Sridhar Deivasigamani, Peoria, IL (US); Sivaprasad Akasam, Dunlap, IL (US)

(72) Inventors: Sridhar Deivasigamani, Peoria, IL (US); Sivaprasad Akasam, Dunlap, IL (US)

(73) Assignee: Intellihot, Inc., Galesburg, IL (US)

( * ) Notice: Subject to any disclaimer, the term of this patent is extended or adjusted under 35 U.S.C. 154(b) by 359 days.

(21) Appl. No.: 14/722,765

(22) Filed: May 27, 2015

(65) Prior Publication Data

US 2015/0349972 A1 Dec. 3, 2015

Related U.S. Application Data

(60) Provisional application No. 62/003,224, filed on May 27, 2014.

(51) Int. Cl.
| | |
|---|---|
| *G01M 1/38* | (2006.01) |
| *G05B 13/00* | (2006.01) |
| *G05B 15/00* | (2006.01) |
| *G05D 23/00* | (2006.01) |
| *G05B 19/042* | (2006.01) |
| *H04W 4/02* | (2018.01) |
| *H04L 12/28* | (2006.01) |
| *G05B 15/02* | (2006.01) |

(52) U.S. Cl.
CPC ......... *G05B 19/042* (2013.01); *G05B 15/02* (2013.01); *H04L 12/2816* (2013.01); *H04W 4/02* (2013.01); *G05B 2219/2614* (2013.01); *G05B 2219/2642* (2013.01)

(58) Field of Classification Search
CPC ........ G05B 19/042; G05B 15/02; H04W 4/02
USPC ....................................................... 700/275
See application file for complete search history.

(56) References Cited

U.S. PATENT DOCUMENTS

| | | | |
|---|---|---|---|
| 8,544,761 B2 | 10/2013 | Deivasigamani et al. | |
| 2011/0178969 A1* | 7/2011 | Falchuk ................... | G06N 5/04 706/45 |
| 2013/0331087 A1* | 12/2013 | Shoemaker ........... | H04L 67/125 455/420 |
| 2014/0171099 A1* | 6/2014 | Sydir ..................... | H04W 4/043 455/456.1 |

(Continued)

*Primary Examiner* — Mohammad Ali
*Assistant Examiner* — Md Azad
(74) *Attorney, Agent, or Firm* — Tracy Jong Law Firm; Tracy P. Jong; Cheng Ning Jong

(57) ABSTRACT

A method for controlling the readiness of an appliance in a system having a mobile device capable of determining its current location, storing a previous location and storing a home location for a delivery point of the appliance, and determining a location change event by comparing the current to previous location to result in a difference. If the mobile device is determined to be close to the home location and the difference magnitude is greater than a threshold, a first distance corresponding to the distance between the current and home location and a second distance corresponding to the distance between the previous and home location are computed. If the first distance is smaller than the second distance, the readiness of the appliance is enhanced. Otherwise, the readiness of the appliance is relaxed.

13 Claims, 3 Drawing Sheets

(56) References Cited

U.S. PATENT DOCUMENTS

2014/0370910 A1* 12/2014 Natucci, Jr. ........... H04W 4/022
　　　　　　　　　　　　　　　　　　　　　　455/456.1
2015/0084750 A1*　3/2015 Fitzgibbon ................ G01S 5/14
　　　　　　　　　　　　　　　　　　　　　　340/12.29

* cited by examiner

USER TRAVEL DIRECTION BASED APPLIANCE CONTROL METHOD

PRIORITY CLAIM AND RELATED APPLICATIONS

This non-provisional application claims the benefit of priority from provisional application U.S. Ser. No. 62/003,224 filed on May 27, 2014. Said application is incorporated by reference in its entirety.

BACKGROUND OF THE INVENTION

1. The Field of the Invention

The present invention is directed generally to a method for controlling the operation of an appliance. More specifically, the present invention is directed to a method for controlling the operation of an appliance based on the likelihood of a user arriving in the vicinity of an appliance such that the user will require the services of the appliance.

2. Background Art

U.S. Pat. No. 8,544,761 entitling "User activated hot water heater and control system" to Applicants discloses a user activated hot water heater and control system for processing hot water to hot water output locations, e.g. faucet, shower, or the like, such that temperature fluctuations and delays in hot water delivery are reduced. The temperature of the hot water delivered is adjusted to a predetermined value determined by a user signature constructed from a potential user physical attributes such as height, weight, and the like. The user activated feature of the 761' patent provides energy savings resulting from the smart, upon demand, activation of internal and/or external recirculation systems. In preferred embodiments incorporating tankless water heaters, the hot water maximum temperature, T(maximum) is dependent on the preference setting or default value of the detected general category user or unique individual user. The user dictated control of hot water heater T(maximum) value will not only further increase energy savings, but additionally provide a safety feature that helps protect heat sensitive people such as children, the elderly and the like from potential water burns. Although the 761' patent discloses a means to wirelessly activate a hot water system, it discloses a sensing capability that is applied to only points of use or delivery of hot water.

Thus, there is a need for a comfort device, e.g., a Heating Ventilating and Air Conditioning (HVAC), a water heating system and an air damper control system, etc., that can be prepared or relaxed with sufficient lead time such that a condition that meets the need of a user can be created by such comfort device and such condition is created with optimal efficiency as the controller of such comfort device is capable of controlling to the desired condition/s at optimal efficiency given the lead time.

SUMMARY OF THE INVENTION

In accordance with the present invention, there is provided a method for controlling the readiness of an appliance in a system having at least one mobile device having location services, the at least one mobile device is capable of determining its current location, storing a previous location and storing a home location for at least one delivery point of the appliance, the method includes determining a location change event of the at least one mobile device upon detection of a trigger by comparing the current location to the previous location to result in a difference, wherein if the magnitude of the difference is greater than a pre-determined threshold and if the at least one mobile device is deemed close to the home location, a first distance corresponding to the distance between the current location and the home location and a second distance corresponding to the distance between the previous location and the home location are computed. If the first distance is smaller than the second distance, the readiness of the appliance is enhanced and if the first distance is greater than the second distance, the readiness of the appliance is relaxed. In one embodiment, the pre-determined threshold is about one mile and the difference is obtained for a period of about 10 minutes.

In one embodiment, the present method further includes detecting a handshake of a mobile device with a communication network to which the appliance is connected, wherein if the appliance is disposed in a relaxed state while the handshake occurs, the appliance is commanded to be ready. In one embodiment, the communication network is a Wide Fidelity (Wi-Fi) network.

In one embodiment, the present method further includes detecting a handshake of a mobile device with a communication network to which the appliance is connected, wherein if the handshake occurs, location polling of the mobile device is terminated and if the mobile device is disengaged from the communication network, location polling of the mobile device is started.

In one embodiment, the present method further includes defining a boundary of a space within which services of the appliance is provided and controlling the appliance based on whether the mobile device is disposed within the space.

In one embodiment, the trigger is the expiration of a timer. In another embodiment, the trigger is the detection of motion of an accelerometer. In another embodiment, the trigger is any combinations a timer and the detection of motion of an accelerometer.

An object of the present invention is to provide a method for controlling the readiness of an appliance to expect an imminent use of the appliance.

Another object of the present invention is to provide a method for controlling the general readiness of an appliance with ample lead time to expect a future use of the appliance.

Another object of the present invention is to provide sufficient lead time for controlling the readiness of an appliance at optimal efficiency.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST

Figure 1:
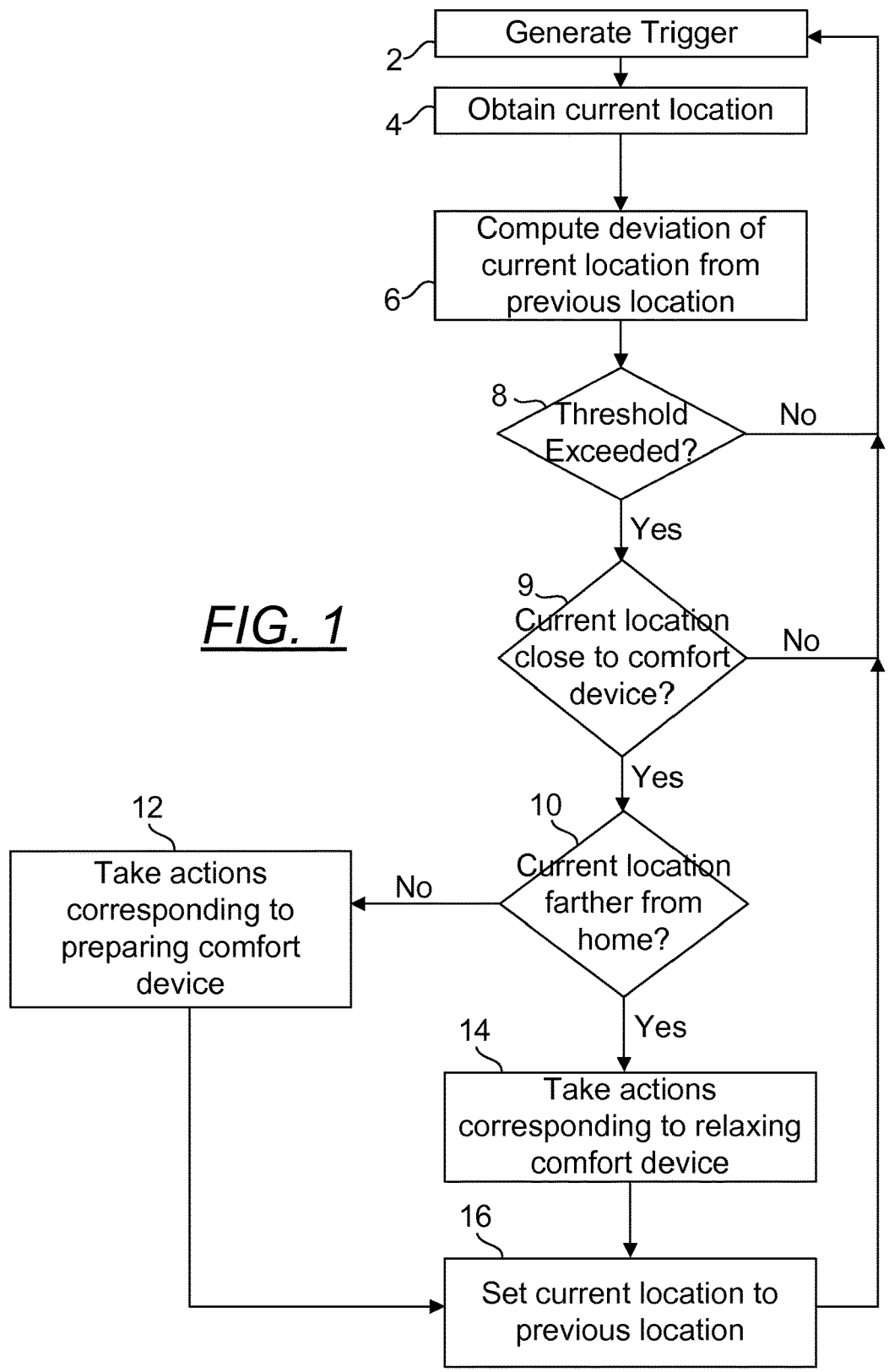
FIG. 1 is a flow diagram depicting a means by which a decision is made to prepare or relax a comfort device.

2—step of generating trigger
4—step of obtaining current location
6—step of computing deviation of current location from previous location
8—step of determining whether deviation exceeds threshold
9—step of determining whether current location is close to comfort device
10—step of determining whether current location is farther than previous location from location where comfort device is controlled
12—step of taking actions corresponding to preparing comfort device
14—step of taking actions corresponding to relaxing comfort device
16—step of setting current location to previous location
17—step of ensuring maximum effort is spent in preparing comfort device
18—comfort device, e.g., thermostat
20—controller of comfort device
22—memory functionally connected to comfort device
23—memory functionally connected to mobile device
24—communication unit functionally connected to comfort device
26—mobile device
28—controller of mobile device
30—Global Positioning System (GPS) unit functionally connected to mobile device
32—communication unit functionally connected to mobile device Particular Advantages of the Invention There are conventional sensor-equipped appliances which can sense the presence of a user at the point of use or delivery and respond to such presence by opening a valve, e.g., in the case of an automatic faucet, etc. Sensing the presence of a user at a point of use of an appliance may not allow sufficient time for the appliance to prepare for the use of the appliance. Further, preparing a space within which the temperature needs to be increased by several degrees Fahrenheit may take some time or the furnace will need to fire at its maximum rate which may not be the optimal rate with respect to efficiency. The present control method enables an earlier or more timely engagement of control actions, thereby enabling long lead time preparation actions, such as, air and water heating at a rate yielding maximum efficiencies at the respective comfort devices.

In addition, the present control method automatically prepares or relaxes an appliance, making it unnecessary for a user to manually turn on or off an appliance in anticipation of use. Most modern thermostats of space heating or cooling systems allow their users to pre-program the setpoint temperature based on time periods of a day and the day of a week. Such a control scheme leaves open the possibility that deviations from the pre-programmed schedule will not be properly serviced and requires manual user intervention or override to alter the setpoint temperature to suit the user. For instance, in order to save energy, a pre-programmed setpoint temperature of an air cooling system during a time period of a day when no users are expected, is purposely set high. However, if a user is unexpectedly present in the space being cooled, the pre-programmed setpoint temperature will be too high for comfort and it will not be automatically adjusted to a level comfortable for the user. The present control method enables automatic preparation of the environment within which a user is to enter, thereby making the environment comfortable for the user upon his or her arrival.

Detailed Description of a Preferred Embodiment

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Disclosed herein is a method for controlling the readiness of an appliance. An appliance can include, but not limited to, a comfort device, e.g., a water heating system, a Heating Ventilating and Air Conditioning (HVAC) system and an air damper control system. For instance, in a tankless water heating system, internal or external recirculations may be effected to add heat to cold water trapped in internal or external recirculation circuits such that delays to provide hot water at points of delivery are reduced or eliminated. In an HVAC system, the setpoint temperature of an air heating system or an air cooling system is typically set according to the time periods of a day or the day of a week. During periods of expected low usage, the air heating or cooling systems are typically set to a setpoint temperature conducive for energy conservation but not necessarily meeting the needs of a user. The present control method allows the detection of an imminent or future use such that the systems can be prepared during the period between the detection of an imminent or future use and the arrival of the user. In an air damper control system, the air flowrate into a space can be increased by increasing the opening area of an air damper adapted to allow air flow into the space and/or by reducing the opening area of one or more dampers adapted to allow air flow into other spaces.

FIG. 1 is a flow diagram depicting a means by which a decision is made to prepare or relax a comfort device. First, a mobile device having location services is made available to a user. A mobile device could be, but not limited to, a cell phone, a personal digital assistant (PDA), an electronic pad, a Global Positioning System (GPS) device, an electronic wearable device, etc. The mobile device is capable of determining its current location as shown in step 4. A previous location of the mobile device is retrieved from a memory 23 of the mobile device, a memory 22 of the comfort device or a remote or web server. A home location for at least one delivery point of the appliance is programmed or determined and stored in a memory of the mobile device, comfort device or a remote or web server. A location change event of the mobile device is determined upon detection of a trigger by comparing the current location to the previous location that is retrieved from the memory to which the previous location had been saved to result in a difference (see step 6). If the magnitude of the difference is greater than a pre-determined threshold (see step 8), the proximity of the mobile device to the comfort device is further verified as shown in step 9. If the mobile device is disposed at a distance less than a pre-determined value from the comfort device, a first distance corresponding to the distance between the current location and the home location and a second distance corresponding to the distance between the previous location as retrieved from the memory and the home location as also retrieved from the memory are computed (see step 10). This pre-determined value can range, e.g., from about two miles to about five miles. If the location of a mobile device is under this pre-determined value, the user to which this mobile device is associated is considered "close" to the comfort device. If the first distance is smaller than the second distance, the mobile device is said to be approaching its home location and if the first distance is greater than the second distance, the mobile device is said to be departing from its home location. In the latter case, the readiness of the appliance is relaxed as shown in step 14. Conversely, the readiness of the appliance is enhanced as shown in step 12. The current location of a mobile device is then saved to a memory, e.g., the memory 23 of the mobile device or the memory 22 of the comfort device as shown in step 16. It is also possible that the location data be saved to a remote or web server via a mobile device or a comfort device and any subsequent computations be carried out in the same remote or web server. If mobile device location data is saved in the memory 23 of the mobile device, subsequent computation of the difference in location is preferably made in the mobile device 26 such that no transmission of pertinent information from the mobile device 26 to the comfort device controller 20 is required for the computation of the difference in location. Only a command to prepare or relax the comfort device 18 is required to be transmitted to the comfort device controller 20. Conversely, if mobile device location data is saved in the memory 22 of the comfort device, this will relieve the mobile devices 26 from performing the computations to determine whether to command the comfort device 18 to prepare itself for an imminent use due to the arrival of a user or to relax from a current use due to the departure of a user from the comfort device. In one embodiment, a distance between a mobile device location and a home location is simply a straight line distance between the two entities. In another embodiment, a distance between a mobile device and a home location is the shortest distance according to a road map. It shall be noted that in some cases, a smaller straight line distance between two points may mean a greater traversed distance between the two points as the straight line distance may not represent an available road for travel. In one embodiment, a trigger to cause the determination of whether a comfort device should be relaxed or prepared as shown in step 2, is the expiration of a timer. A polling service is set up in a mobile device or a comfort device controller, where a timer is started and set to expire after a user-determined amount of time has elapsed. Upon expiration of the timer, a current location is polled or requested. By polling at appropriate rates, e.g., once every 10, 30 or 60 minutes, etc., excessive drain in the power source of the mobile device can be avoided as polling for a GPS location consumes energy. In one embodiment, the pre-determined threshold is about one mile and the difference is obtained for a period of about 10 minutes or a polling frequency of 1 poll of the current location per 600 seconds (or 10 minutes). In other words, if a user carrying the mobile device has traveled a mile or more in 600 seconds, further computations will be carried out to determine whether the comfort device functionally connected to the mobile device will need to be relaxed or prepared. In another embodiment, the trigger is the detection of motion of an accelerometer. This trigger is preferably selected only if the user has the habit of not carrying the mobile device with him or her everywhere he or she goes. Therefore, most false needs for causing a trigger due to excessive movements and hence excessive false detection of motions can be avoided. In another embodiment, the trigger is any combinations of the expiration of the timer and the detection of motion of an accelerometer. It is possible that by using such combinations, polling frequency can be reduced as the mobile device no longer relies solely on requesting a current location at predetermined intervals but also on indications that a change in the location of the user has taken place, thereby possibly causing a change in the need for the home comfort device.

In another embodiment, the indication of a need to prepare a home comfort device is detected when the travel path of a mobile device matches that of a trajectory on a map. For instance, if a user travels streets x and y in certain directions, the user is assumed to be headed home. In addition, the distance between the mobile device and the home location may also be used to indicate whether an action is required. If the distance is within a certain predetermined range and that a match of the travel path and the trajectory on the map has been detected, preparation of the home comfort device is deemed necessary. Conversely, if the distance falls outside of a certain pre-determined range that indicates the proximity of a mobile device to home and that a match of the travel path and the corresponding trajectory on the map has been detected and the previous distance falls within the predetermined range, the home comfort device may be relaxed.

For a comfort device where multiple users (e.g., multiple members of a family) are registered to a comfort device control system, the control decision is based on the member that is closest to the home location. It is also possible that with multiple users functionally connected to a comfort device, the users may register the same location (as can be the case where the mobile devices are placed so closely together) that their GPS location are deemed the same or the mobile devices are connected through, for example, but not limited to, the same communication network, e.g., Wireless Fidelity (Wi-Fi) and hence the same Domain Name System (DNS) system that indicates the mobile devices are placed at the same location.

In yet another embodiment, the present control method is adapted to provide targeted output control to various spaces of the building it services. For example, the temperature of a space is preferably controlled to a comfortable temperature, e.g., 70 degrees Fahrenheit only when a user is present in the space. One way to carry out selective air temperature control is by providing an alterable air flow rate to a space. This can be accomplished in a forced air heating or cooling system equipped with air delivery ducts by having automatic dampers where their settings are alterable. An automatic damper is controlled to a setting commensurate with its responsibility. For instance, upon detecting the presence of a mobile device in a space, the damper through which air is supplied to the space is adjusted such that the air flow rate into the space is altered. An automatic damper is defined as a damper having a powered adjustable opening via which the flow rate of the air flow can be adjusted. In a typical central air installation, the air driven from a blower traverses air ducts of various lengths and cross-section profile areas. Therefore, the pressure drop experienced in various ducts may vary considerably. Such a factor may be taken into account when controlling the damper setting as similar damper settings in different spaces may not yield the same air flow rate for the reason disclosed earlier. The same principles may be applied to water heating, i.e., water heating for a space may be prepared or relaxed depending on whether a mobile device is detected within the space. In another embodiment, damper settings are not only based on the presence of a user in a space but also the preferences set by the user. In one embodiment, a space is defined by a user as any area within a boundary marked by points that are either manually entered or points that are marked using a GPS device. Any location described by its longitude and latitude that falls within an area delineated by the boundary is considered located within the space.

A mechanism for establishing a home location includes, but not limited to, bringing the mobile device to within the vicinity of the thermostat and recording the location as indicated in a GPS device. In another embodiment, the location is DNS based, especially for coarser location determination through a service of the thermostat or the mobile device, such as guesses on the city, area code, longitude and latitude of the location, etc. may be possible. As such location determination is based on best guesses, DNS based location determination may not provide sufficient accuracy in some cases but acceptable accuracy for other instances. In yet another embodiment, the location is obtained from the output of another location-determining device and entered manually in the mobile device or the thermostat.

Figure 2:
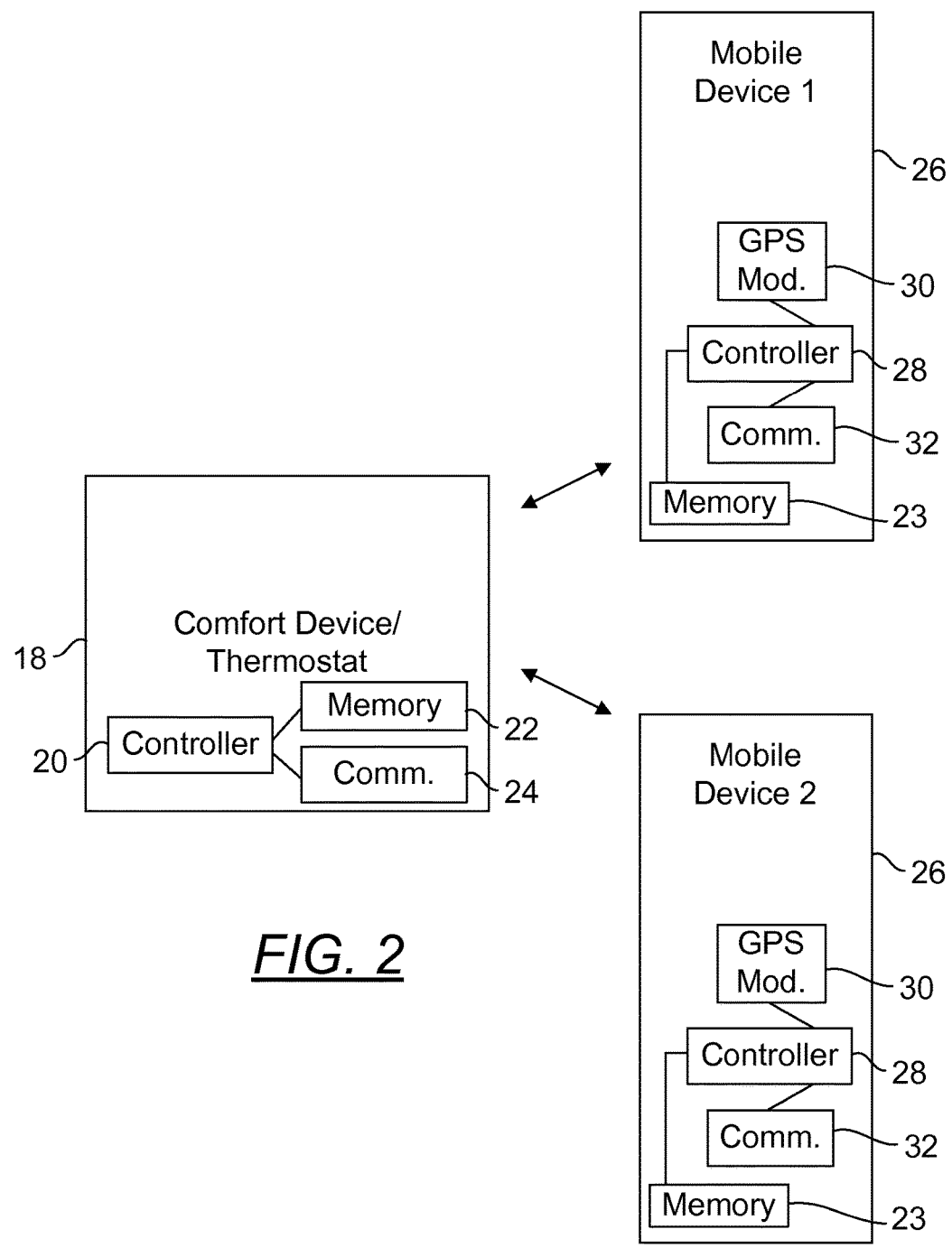
FIG. 2 is a diagram depicting the control mechanism of a comfort device or thermostat and two mobile devices functionally connected to the control mechanism.

FIG. 2 is a diagram depicting the control mechanism of a comfort device 18 and two mobile devices 26. In this example, the comfort device 18 is paired with two mobile devices, i.e., Mobile Device 1 and Mobile Device 2. As such, FIG. 2 depicts a system which can be used by multiple (i.e., more than one) users, each carrying one of the two mobile devices 26. Although not shown, additional mobile devices 26 may be paired with the comfort device 18. Each comfort device 18 includes a controller 20, memory 22 and communication unit 24. In one example, some information, such as operating parameters of the comfort device 18 may be locally stored in the memory 22. In another example, the same information is also transmitted and stored in a remote or web server. Each mobile device 26 includes a controller 28, communication unit 32 and GPS module 30. A mobile device 26 can be a purpose-built device having such services or it can be a cell phone having such services already built in. In one embodiment, the communication unit 24 of the comfort device 18 is adapted to communicate with any mobile devices 26 registered to communicate with the comfort device 18 and via Wi-Fi protocol to a modem. In one embodiment, parameters, for instance but not limited to the operating parameters of the comfort device 18, air temperature settings throughout various time zones in a day, output water temperature, and various other vital information and statistics may be stored in a remote or web server upon transmission from the comfort device 18, via a communication means, e.g., Wi-Fi. Such information can be made available upon request to an internet browser or an application running on a computing device, e.g., a mobile device or computer. A user is therefore allowed to view or download such information for further analysis.

Figure 3:
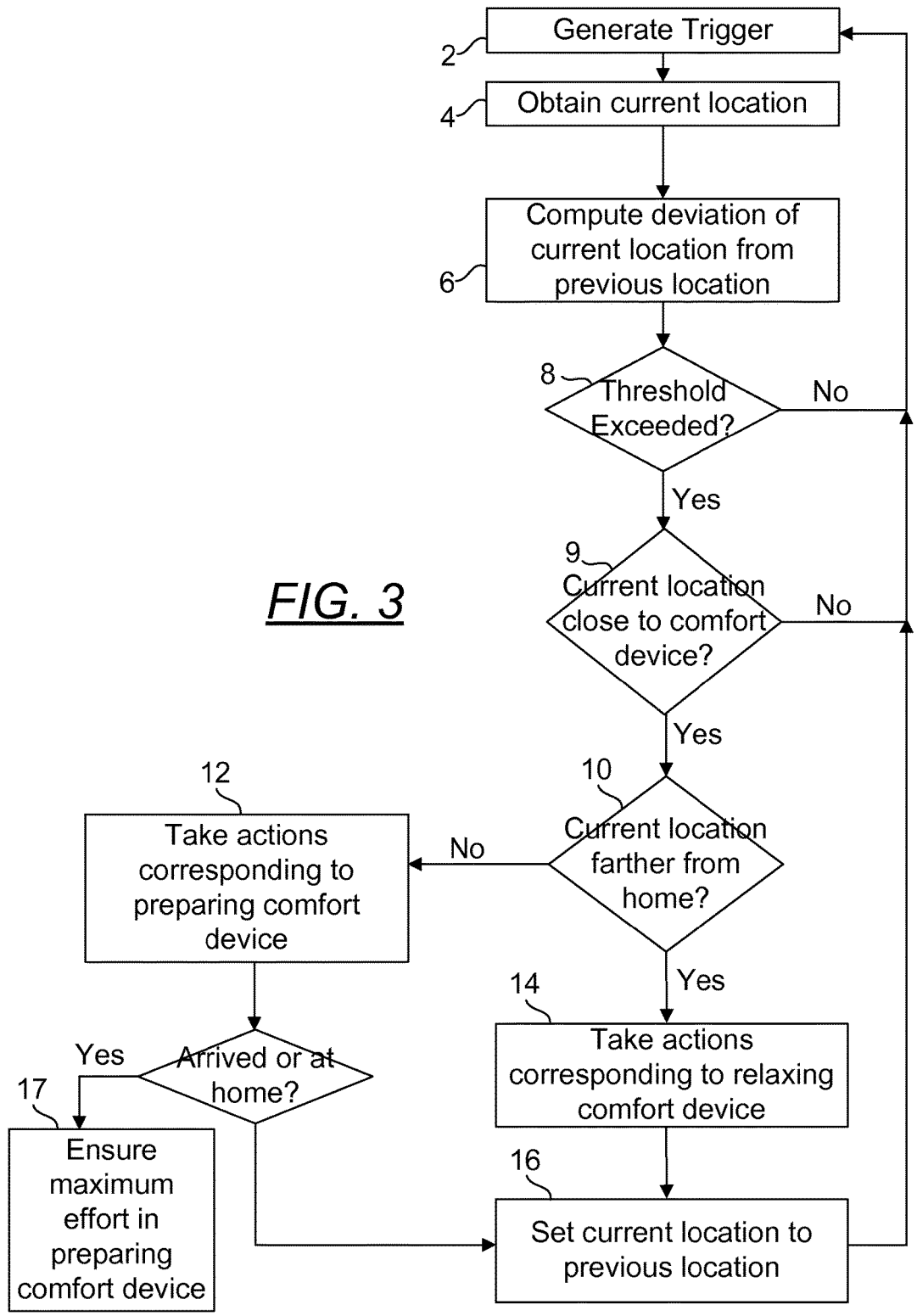
FIG. 3 is a flow diagram depicting a means by which a decision is made to prepare or relax a comfort device using an additional input to indicate whether the need for preparing the comfort device is imminent.

FIG. 3 is a flow diagram depicting a means by which a decision is made to prepare or relax a comfort device using an additional input to indicate whether the need for preparing the comfort device is imminent. In this embodiment, the concept of "arriving home" or "being at home" is used to ensure that a home device is properly prepared to service a user regardless of the data sampling rate used in FIG. 1. It may be argued that, in order to determine whether or not a user is currently at home, a GPS location can simply be polled or obtained of a location device and the location is subsequently compared to the established home location. If such comparison has not occurred due to the lack of polling request due to a low polling frequency, a last resort detecting means may be used to ascertain that the mobile device has arrived home and therefore no effort should be spared in preparing the comfort device (as shown in step 17) as a need for it is now considered imminent. A private wireless communication network typically has an access point range of from tens of feet to hundreds of feet. In one embodiment, the handshake of the mobile device while entering the range or influence of a Wi-Fi network to which the comfort device is connected, is used to indicate that the home comfort device must be prepared as soon as possible. In one embodiment, the event of exiting a Wi-Fi network may be used to cause polling of mobile device location to start and the event of entering the Wi-Fi network may be used to cause polling of mobile device location to stop.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is computed to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A method for controlling a readiness of an appliance in a system having at least one mobile device capable of determining its current location, storing a previous location and storing a home location of at least one delivery point of the appliance, a controller operably connected to the appliance, said method comprising using the controller for:
    (a) detecting a handshake of the at least one mobile device with a communication network to which the appliance is connected, wherein if said handshake occurs, location polling of the at least one mobile device is terminated and if the at least one mobile device is disengaged from said communication network, location polling of the at least one mobile device is started;
    (b) determining the existence of a location change event of the at least one mobile device upon detection of a trigger by comparing said current location to said previous location to result in a difference, wherein if the magnitude of said difference is greater than a predetermined threshold, a location change event is deemed to exist and said trigger is selected from the group consisting of the expiration of a timer, a detection of motion of an accelerometer of the at least one mobile device and any combinations thereof; and (c) if said location change event is deemed to exist, computing a first distance corresponding to the distance between said current location and said home location and a second distance corresponding to the distance between said previous location and said home location, enhancing the readiness of the appliance if said first distance is smaller than said second distance and relaxing the readiness of the appliance if said first distance is greater than said second distance.

2. The method of claim 1, further comprising detecting a handshake of the at least one mobile device with a communication network to which the appliance is connected, wherein if the appliance is disposed in a relaxed state while said handshake occurs, the appliance is commanded to be ready.

3. The method of claim 2, wherein said communication network is a Wide Fidelity (Wi-Fi) network.

4. The method of claim 1, wherein the appliance is selected from an apparatus selected from the group consisting of a water heating system, an air heating system, an air cooling system and an air damper control system.

5. The method of claim 1, wherein said pre-determined threshold is about one mile and said difference is obtained for a period of about 10 minutes.

6. The method of claim 1, further comprising defining a boundary of a space within which services of the appliance is provided and controlling the appliance based on whether the at least one mobile device is disposed within said space.

7. The method of claim 1, wherein the at least one mobile device is a device selected from the group consisting of a cell phone, a personal digital assistant (PDA), an electronic pad, a Global Positioning System (GPS) device and an electronic wearable device.

8. A method for controlling a readiness of an appliance in a system having at least one mobile device capable of determining its current location, storing a previous location and storing a home location of at least one delivery point of the appliance, a controller operably connected to the appliance, said method comprising using the controller for:

(a) determining the existence of a location change event of the at least one mobile device upon detection of a trigger by comparing said current location to said previous location to result in a difference, wherein if the magnitude of said difference is greater than a predetermined threshold, a location change event is deemed to exist and said trigger is selected from the group consisting of the expiration of a timer, the detection of motion of an accelerometer of the at least one mobile device and any combinations thereof;

(b) if said location change event is deemed to exist, computing a first distance corresponding to the distance between said current location and said home location and a second distance corresponding to the distance between said previous location and said home location, enhancing the readiness of the appliance if said first distance is smaller than said second distance and relaxing the readiness of the appliance if said first distance is greater than said second distance; and (c) detecting a handshake of the at least one mobile device with a communication network to which the appliance is connected, wherein if the appliance is disposed in a relaxed state while said handshake occurs, the appliance is commanded to be ready and if said handshake occurs, location polling of the at least one mobile device is terminated and if the at least one mobile device is disengaged from said communication network, location polling of the at least one mobile device is started.

9. The method of claim 8, wherein said communication network is a Wide Fidelity (Wi-Fi) network.

10. The method of claim 8, wherein the appliance is selected from an apparatus selected from the group consisting of a water heating system, an air heating system, an air cooling system and an air damper control system.

11. The method of claim 8, wherein said pre-:determined threshold is about one mile and said difference is obtained for a period of about 10 minutes.

12. The method of claim 8, further comprising defining a boundary of a space within which services of the appliance is provided and controlling the appliance based on whether the at least one mobile device is disposed within said space.

13. The method of claim 8, wherein the at least one mobile device is a device selected from the group consisting of a cell phone, a personal digital assistant (PDA), an electronic pad, a Global Positioning System (GPS) device and an electronic wearable device.

* * * * *